July 22, 1941.　　　R. W. NILES ET AL　　　2,250,167

TROLLEY BRACKET

Filed Oct. 24, 1939

INVENTORS
RAYMOND WALTER NILES
THOMAS C. PEW
BY Joseph Darley
ATTORNEY.

Patented July 22, 1941

2,250,167

UNITED STATES PATENT OFFICE 2,250,167

TROLLEY BRACKET

Raymond Walter Niles, Saline, and Thomas C. Pew, Ann Arbor, Mich.

Application October 24, 1939, Serial No. 301,076

5 Claims. (Cl. 105—154)

The subject matter of this invention is an improved form of trolley bracket for overhead conveyors.

Former constructions of these trolley brackets were all of a general type in which the ball bearing trolley wheel was bolted to the head or boss of the bracket. The bolt used was specially designed for this purpose, having a form of head adapted to engage the inner race of the bearing, securing it to the bracket, and at the same time preventing it from rotating with the outer race or trolley wheel. A hole of small diameter was usually drilled through the longitudinal center of the bolt so that grease or other lubricant could be supplied to the bearing, and, therefore, the nut used with this bolt had to be of a special form such that a grease gun could be readily employed for injecting lubricant. Customary practice was either to attach a pressure fitting of the Alemite type to the outer surface of the nut, or provide a conical recess in the nut which led to the hole in the center of the bolt, the nozzle of the grease gun being inserted in this recess.

From the standpoint of both the manufacturer and the user this construction resulted in many disadvantages. First, the use of this special bolt and nut added appreciably to the cost of production and purchase; and secondly, it increased the amount and cost of maintenance necessary to insure continued satisfactory operation of the conveyor. This second disadvantage is the result of several factors, namely: the bearing area provided by this bolt was of a limited amount; the bolt was weakened by having its center drilled for lubrication purposes; the amount of lubricant that could be supplied to the bearing at any one time was not very great because the space within the inner race of the bearing, which acts as a reservoir, was in most cases almost entirely occupied by the head of the bolt; and rotation of the trolley wheel tended to loosen the bolt and allow the inner race of the bearing to revolve, producing abnormal wear and unsatisfactory operation. If Alemite fittings were used to facilitate lubrication, they protruded from the outer face of the head of the bracket and were prone to be damaged or broken off by striking objects during the operation of the conveyor.

Therefore, in order to keep repairs at a minimum, frequent lubrication and inspection of the trolleys and trolley brackets was necessary, when as a general rule users of this equipment gave it very little attention but nevertheless expected satisfactory operation.

With this and the objectionable features of former constructions in mind, the object of this invention in general is to simplify and improve the design of trolley brackets for overhead conveyors.

Another object is to design a trolley bracket which will require very little attention and service when in operation.

A further object is to produce a bracket in which the use of a bolt as a means of securing the trolley wheel thereto is eliminated.

Another object is to provide a greater bearing area between the bracket and the trolley than was customary in former practice.

Other objects and advantages will be apparent from the following detailed description of the invention and the accompanying drawing thereof forming a part of this specification and in which.

Figure 1:
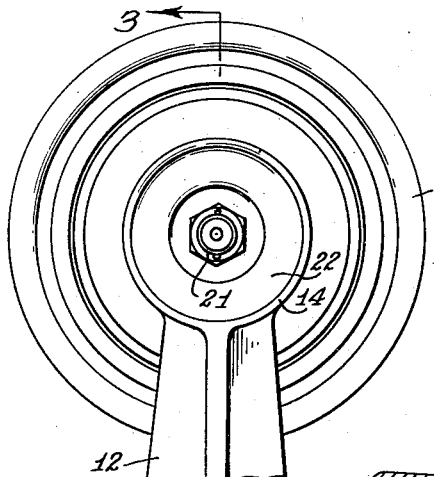
Fig. 1 is a front view of the upper portion of the bracket with a trolley mounted thereon.
Figure 2:
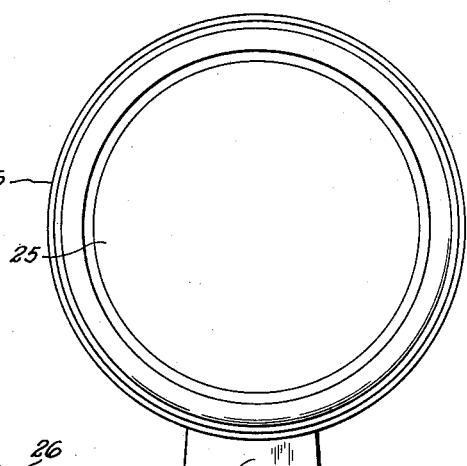
Fig. 2 is a rear view of the structure shown in Fig. 1.
Figure 3:
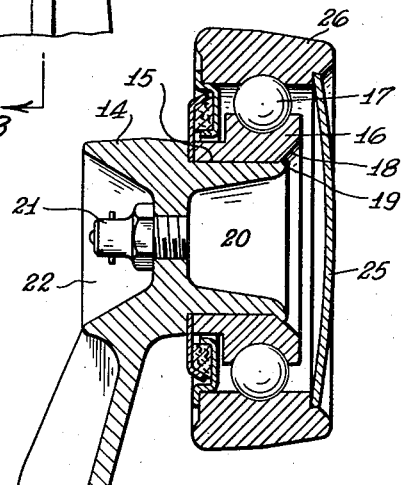
Fig. 3 is a section of the entire bracket and roller taken along the line 3—3 of Fig. 1.

The bracket shown in Fig. 3 is of conventional shape, having a vertically extending lower portion 12 which is adapted to be connected by bolts through the holes 13 to a complementary bracket, so that the two combined straddle the usual I-beam conveyor rail. From this lower portion 12 the bracket extends in the shape of an elbow to the head or boss 14 which has its inner portion 15 machined or turned down to receive the inner race 16 of the bearing 17 with a press fit. The inner race 16 is specially designed to be used with this type of bracket, it being provided with a chamfered surface 18 such that after the bearing has been pressed on to the head, the inner circumference 19 of the machined portion 15 is spun down or swaged into engagement with this surface 18 of the inner race, thereby securely affixing the bearing to the bracket. By means of the recess 20 formed in the inner portion of the head, and the conventional disc seal 25 used on the inner surface of the trolley wheel or outer race 26, a large reservoir for lubricant is provided. Lubricant is supplied to this reservoir through the Alemite fitting 21, positioned within another recess 22 formed in the outer portion of the head of the bracket, this recess being of sufficient depth to completely surround the fitting 21 and protect it from damage.

Figure 4:
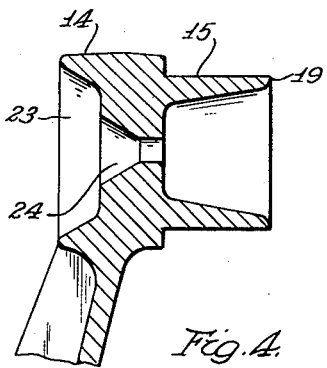
Fig. 4 is a view similar to that of Fig. 3 but showing a slightly different form of bracket before the roller has been mounted thereon.

Fig. 4 shows an alternate type of head construction, used when a grease fitting is not provided, having a shallower outer recess 23 and a cone-shaped hole 24 to receive the end of a grease gun. The view also shows the condition of the inner circumference 19 of the head before the bearing has been fitted.

It can be seen that the invention results in a new form of trolley bracket having features which eliminate many of the aforementioned disadvantages of previous types. Because of the simplicity of the construction, fewer parts are required and the time and cost of manufacture and assembly are lessened. In assembly, the trolley wheel is mounted directly upon an integral part of the bracket having a large diameter and bearing area, and once assembled, the trolley and bracket practically become one unitary structure which could only be destroyed by a major structural failure caused by severe overload or a complete lack of lubrication in the bearing. The possible occurrence of this latter cause of failure is made very remote by the lubrication system provided which includes the unusually large grease reservoir within the bearing and the head of the bracket, plus the protected fitting through which the lubricant is supplied.

I claim:

1. A bracket for use with overhead conveyors having a cylindrical surface on the upper portion thereof, said cylindrical surface constituting a bearing support for a trolley wheel which is attached thereto, and a reservoir for lubricant formed within said cylindrical surface.

2. A bracket for use with overhead conveyors having a cylindrical surface on the upper portion thereof, said cylindrical surface constituting a bearing support for a trolley wheel which is attached thereto, a reservoir for lubricant formed within said cylindrical surface, and means for providing lubricant to said reservoir.

3. A combination of bracket and trolley wheel for trolley conveyors, characterized by said bracket having a turned-down portion on the upper part thereof, said trolley wheel being fitted upon said turned-down portion and secured to said bracket by a swaging of the outer circumference of said turned-down portion into engagement with the inner race of said trolley wheel, a reservoir for lubricant formed within said turned-down portion of said bracket, and means contained within the outer portion of the head of said bracket for supplying said lubricant to said reservoir.

4. A conveyor bracket having a lower portion adapted to be connected to a conveyor chain, a boss formed on the upper portion of said bracket, and a turned-down bearing support on the inner part of said boss adapted to receive the inner race of a trolley wheel.

5. A conveyor bracket having a boss formed on the upper portion thereof, a turned-down portion on the inner part of said boss, a shoulder between the surface of said turned-down portion and the outer surface of said boss, an inner race of a trolley wheel carried by said turned-down portion and abutting against said shoulder, said inner race being longitudinally confined upon said turned-down portion by a projection formed upon the inner periphery of said turned-down portion, a reservoir for lubricant formed within said turned-down portion, the outer face of said boss being provided with a recess, an aperture connecting said recess to said reservoir, and a fitting associated with said aperture whereby lubricant can be injected into said reservoir, the outer circumference of said boss projecting beyond the outer surface of said fitting.

RAYMOND WALTER NILES.
THOMAS C. PEW.